United States Patent [19]

Holley et al.

[11] Patent Number: 4,659,053
[45] Date of Patent: Apr. 21, 1987

[54] TILTABLE MOUNT

[76] Inventors: Edwin S. Holley, 330 Coachman Dr., Jacksonville, Oreg. 97530; James A. McBee, 449 N. Central Valley Dr., Central Point, Oreg. 97502

[21] Appl. No.: 791,619

[22] Filed: Oct. 25, 1985

[51] Int. Cl.[4] .............................................. A47B 91/00
[52] U.S. Cl. .................................... 248/663; 248/181; 248/395; 248/371; 248/133; 403/90; 403/123; 62/297
[58] Field of Search ............... 248/140, 142, 181, 516, 248/393, 395, 397, 398, 371, 349, 133, 663; 62/239, 297; 403/90, 123, 114, 122, 87

[56] References Cited

U.S. PATENT DOCUMENTS

| 86,173 | 1/1869 | Maynard | 403/123 |
|---|---|---|---|
| 141,121 | 7/1873 | Collins | 248/371 |
| 673,334 | 4/1901 | Casebolt | 248/371 |
| 988,084 | 3/1911 | Fleege | 248/663 |
| 1,210,411 | 1/1917 | Bryhnan | 248/663 |
| 1,996,071 | 4/1935 | Kahn | 403/90 |
| 2,126,389 | 8/1938 | Hufferd | 403/123 |
| 2,500,784 | 3/1950 | Anderson | 403/123 |
| 2,571,443 | 10/1951 | Hair | 248/397 |
| 2,746,700 | 5/1956 | Barbera | 248/516 |
| 2,893,674 | 7/1959 | Monaco | 248/1 F |
| 3,122,257 | 2/1964 | Soehrman | 248/371 |
| 3,603,545 | 9/1971 | Boniface | 248/371 |
| 3,632,076 | 1/1972 | Rogers, Jr. | 248/371 |
| 3,902,816 | 9/1975 | Moore | 403/114 |
| 3,970,274 | 7/1976 | Resk | 248/371 |
| 3,970,792 | 7/1976 | Benham | 248/183 |
| 4,300,696 | 11/1981 | Bryce | 248/133 |
| 4,354,654 | 10/1982 | Werner | 248/663 |
| 4,475,314 | 10/1984 | Faix | 403/90 |
| 4,483,503 | 11/1984 | Gahan | 248/349 |
| 4,494,720 | 1/1985 | Gregory et al. | 248/371 |
| 4,500,060 | 2/1985 | Anderson et al. | 248/349 |

FOREIGN PATENT DOCUMENTS 224304 7/1910 Fed. Rep. of Germany ...... 248/516

Primary Examiner—Cornelius J. Husar
Assistant Examiner—Eric K. Nicholson
Attorney, Agent, or Firm—Klarquist, Sparkman, Campbell, Leigh & Whinston

[57] ABSTRACT

A tiltable mount comprises a stationary base member or base and a support member or support for supporting equipment thereon. The support is movably mounted to the base to enable the support to tilt omnidirectionally relative to the base while remaining rotationless relative to a vertical axis through the base. The base and support have mating spherical surfaces, with the concave spherical surface of the base including a guide shaft and the convex spherical surface of the support including a conical aperture for receiving the shaft. The shaft and aperture form a pivotable connection between the two members. A lock for maintaining a selected tilt to the support comprises the guide shaft and a lever attached to the shaft to press the support against the base sufficiently to prevent relative movement therebetween. The lever is threadedly attached to the guide shaft and may include a nut assembly having a nut and a lever arm removably mated to the nut assembly for repeated rotary movement of the nut.

6 Claims, 6 Drawing Figures

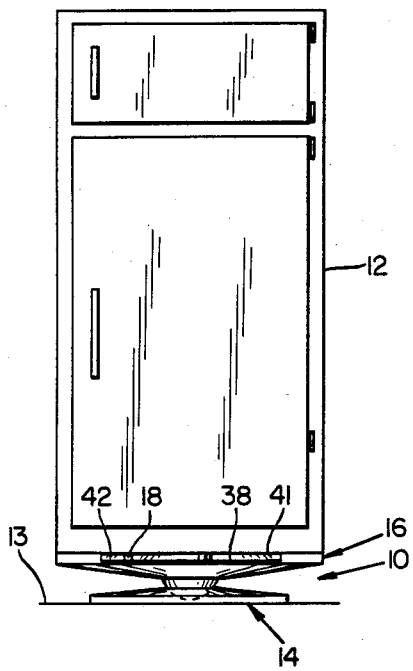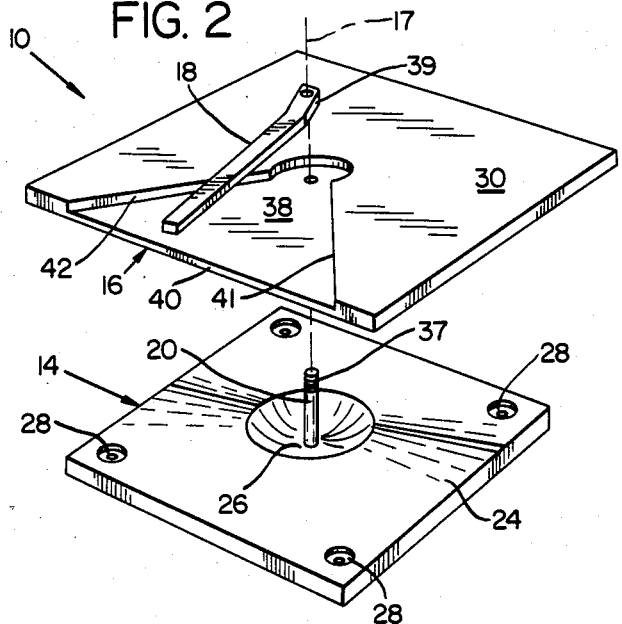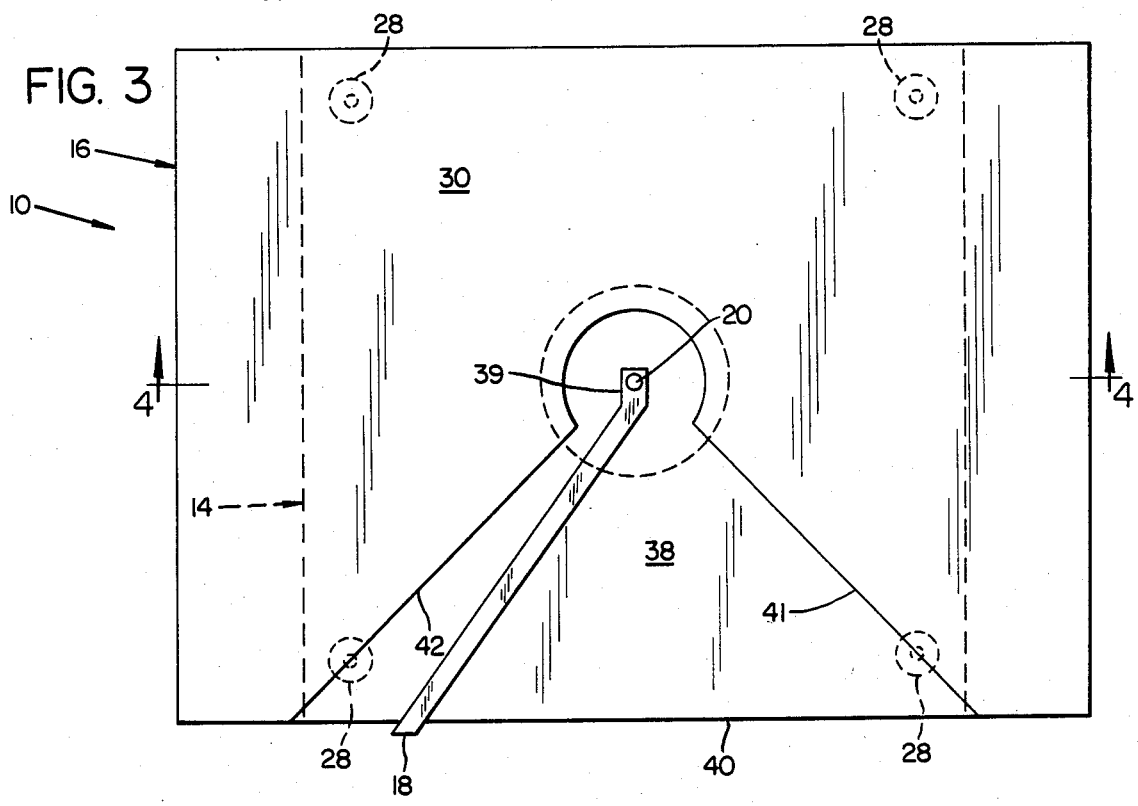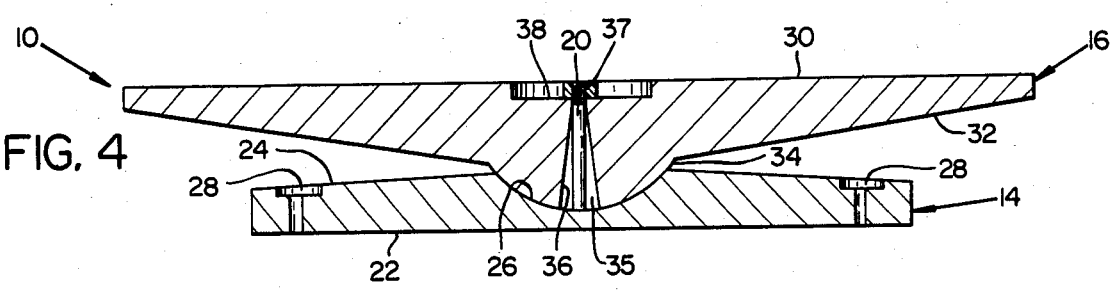

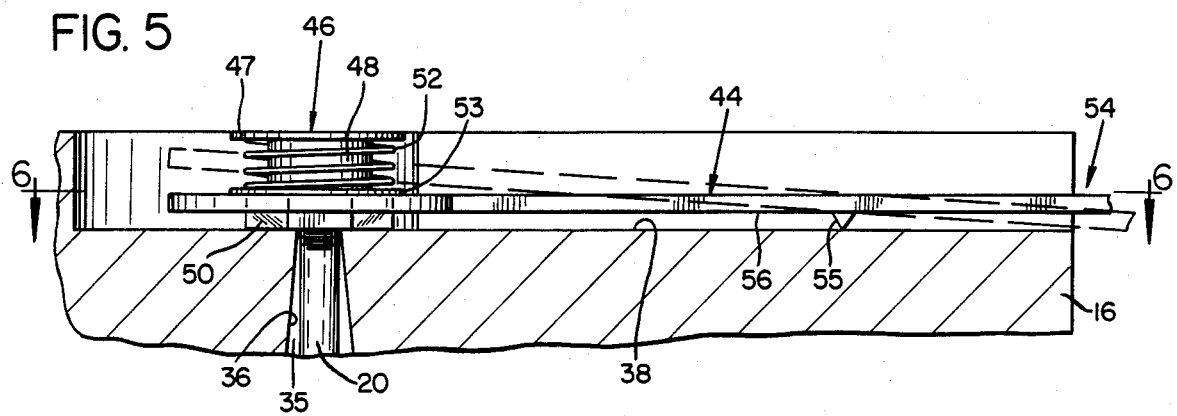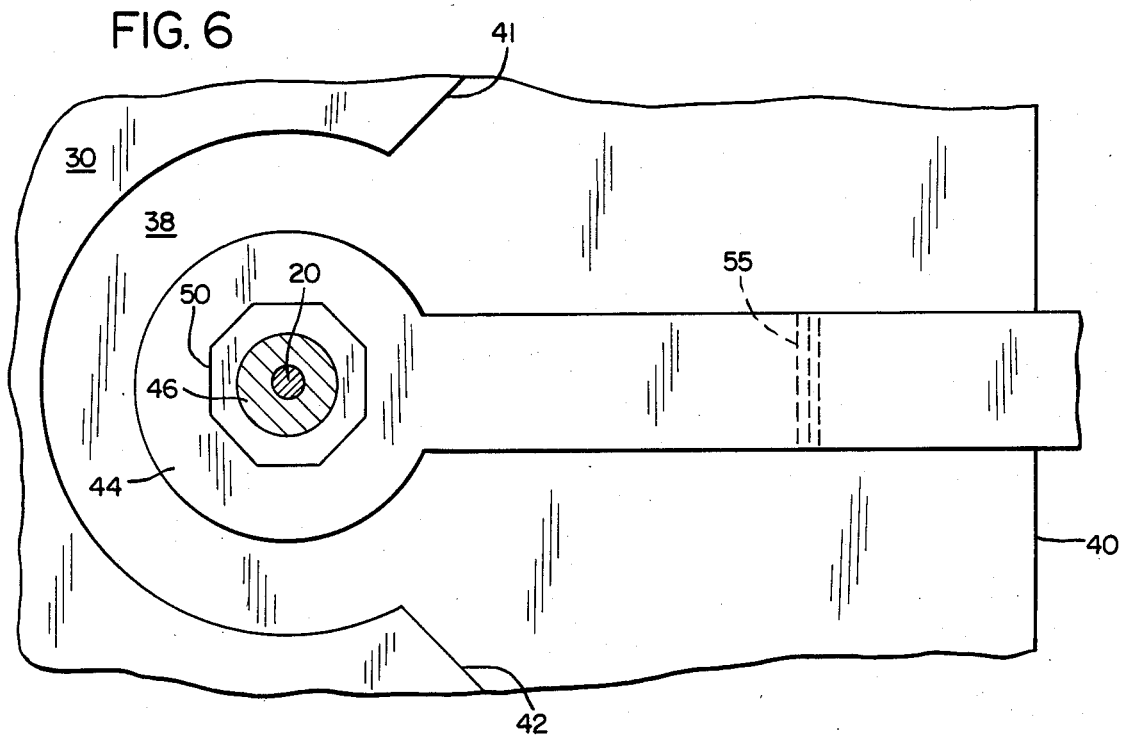

TILTABLE MOUNT

BACKGROUND OF THE INVENTION

This invention relates to adjustable mounts for supporting equipment and, more particularly, to an adjustable mount that can be tilted omnidirectionally without rotating the equipment mounted thereon.

Several kinds of equipment require that they be substantially vertical relative to the ground and the effects of gravity to operate properly. Refrigerators, for example, cannot be operated at a tilt for more than a short time before they are permanently-damaged. Such a situation may arise with a refrigerator mounted in a recreation vehicle that is parked on an incline. The refrigerator must be shut off, rendering it useless for storing foods that must be preserved.

The present state of the art offers several mounts that can support equipment and level it, but these mounts often require that the equipment be horizontally rotated before it can be tilted at the desired position. For example, U.S. Pat. No. 4,483,803 to Gahan discloses a swivel mounting for adjusting the tilt of a television mounted thereon. The mounting includes a base member and support member with mating spherical surfaces. But tilting of the support member is restricted by a diametral slot in the support to a single plane. To tilt the television to a predetermined position, the support member is rotated horizontally relative to the base member and then tilted. In the process, the direction in which the television faces also changes.

Similarly, a swivel-tilt platform disclosed in U.S. Pat. No. 4,500,060 to Anderson has a tilt platform resting on a base member. The limited plane of tilt of the platform requires that it be rotated horizontally to tilt a computer monitor to the selected position. Other devices that require horizontal rotation for omnidirectional tilting are shown in U.S. Pat. No. 3,603,545 to Boniface and U.S. Pat. No. 3,970,274 to Resk. Rotation, however, is often impractical. In the example of the refrigerator mounted in a recreation vehicle, the refrigerator cannot be rotated on a conventional mount because of the limited space within the vehicle.

Therefore, a need remains for an adjustable mount that can be tilted omnidirectionally without rotating the equipment mounted thereon.

SUMMARY OF THE INVENTION

It is an object of the invention to provide an improved tiltable mount that can be tilted omnidirectionally without horizontally rotating the equipment mounted thereon.

It is another object of the present invention to provide a tiltable mount that can be locked at a selected tilt.

It is yet another object of the invention to provide a tiltable mount that can maintain equipment mounted thereon in a level position.

It is still another object of the invention to provide a tiltable mount that is simple to maintain, easy to operate and repair, and inexpensive to manufacture.

To achieve these objects, a tiltable mount includes a stationary base member and a support member for supporting equipment thereon. The support is movably mounted to the base to enable it to tilt omnidirectionally relative to the base while remaining rotationless relative to a vertical axis through the base. Locking means for locking the base and support against relative movement are also provided.

In a first embodiment of the invention, the base and support have mating spherical surfaces, with the base further including a guide shaft extending from a concave spherical service. A matching convex spherical surface of the support includes a conical aperture therein for receiving the guide shaft and forming with the shaft a pivotable connection between the base and support. The base and support also have opposing conical outer surfaces in which their spherical surfaces are centered. The conical surfaces may be engaged to limit the tilt of the support and thereby provide it with additional support from the base.

The locking means for locking the support and base together at a selected tilt comprises the guide shaft and a lever means attached to the shaft. The lever means is adapted to press the support against the base sufficiently to prevent relative movement therebetween. In this first embodiment, the lever means is threadedly attached to the guide shaft.

In a second embodiment, the lever includes a nut assembly having a nut and a lever arm removably mated to the assembly for repeated movement of the nut. The assembly includes in addition to the nut, a retaining ring for retaining the assembly to the lever arm and a spring for urging the lever arm onto the nut. The lever arm is mated to the nut until torque is applied to the lever arm to remove it therefrom, making the lever arm freely rotatable about the assembly.

The foregoing and other objects, features, and advantages of the invention will become more apparent from the following detailed description of the preferred embodiments which proceeds with reference to the accompanying drawings.

BRIEF DESCRIPTION OF THE DRAWINGS

FIG. 1 is a side elevational view of a tiltable mount according to the invention, shown supporting a refrigerator.

FIG. 2 is an exploded view of the mount.

FIG. 3 is a plan view of the mount.

FIG. 4 is a cross-sectional view taken along line 4—4 of FIG. 3.

FIG. 5 is a side view of a second embodiment of a locking lever.

FIG. 6 is a top view of the locking lever of FIG. 5 taken along line 6—6 thereof.

DETAILED DESCRIPTION

A tiltable mount 10 according to the invention is shown in operation in FIG. 1, supporting equipment that must be levelly maintained such as a refrigerator 12. The refrigerator rests atop the mount, which permits the refrigerator to be tilted omnidirectionally without rotating it horizontally. Once tilted to a selected position, it can be held there by locking the mount. The tilting is relative to the ground surface 13 on which the mount rests and is done to maintain the refrigerator level for proper operation.

Referring to FIG. 2, mount 10 comprises a stationary base member 14 and a pivotable support member 16 for supporting refrigerator 12 thereon. Support 16 is movably mounted to base 14 to enable the support 16 to tilt omnidirectionally relative to base 14 while remaining rotationless relative to a vertical axis 17. Members 14 and 16 are preferably made of strong, lightweight material. To maintain a selected tilt, a locking means such as a lever 18 is threadedly attached to a guide shaft 20 to lock members 14 and 16 against relative movement therebetween. Shaft 20 is preferably made of a high-impact, self-lubricating material such as teflon.

Base member 14 is shown in perspective in FIG. 2 and in cross section in FIG. 4. The member 14 is rectangular in shape with a flat bottom surface 22 and a frusto conical surface 24 that includes a central depression having a concave spherical surface 26. Bottom surface 22 is roughened to make it frictional for stationarily gripping the floor and is of an area sufficient to provide adequate support to the mounted refrigerator. Base member 14 may also include bolts 28 or other fastening means for fastening it to the floor. Guide shaft 20 extends from within concave surface 26 normally along vertical axis 17 to center the support member 16 on the base.

The radius of concave surface 26 may vary depending on the type of equipment mounted on mount 10 and the degree of tilting required. For heavier equipment, such as refrigerator 12, concave surface 26 may have a radius about 1/6 the width of member 14 to limit torque on the mount 10. For lighter equipment, the radius may be as small as ⅛ the width of the base member, thereby allowing for a greater degree of tilting.

Support member 16 is also shown in perspective in FIG. 2 and in cross section in FIG. 4. It has an upper planar surface 30 to support refrigerator 12 and an inverted frusto conical surface 32. Planar surface 30 is roughened to make it frictional to grip the bottom of refrigerator 12 and may include clamps (not shown) for clamping refrigerator 12 to member 16. Conical surface 32 includes a central protuberance having a convex spherical surface 34 and a radius matching that of concave surface 26. Within member 16 is a conical aperture 35 extending through the member, with its base at convex surface 34 and its apex at planar surface 30. Aperture 35 receives shaft 20 to form a pivotable connection between the support and base members, as best seen in FIG. 4.

The mating spherical surfaces 26, 34 allow support member 16 to slide and rotate relative to base member 14. By such sliding, member 16 may be tilted omnidirectionally to a selected angle relative to member 14 while remaining rotationless about vertical axis 17. The maximum angle of tilt in the embodiment illustrated is about ±7° because that angle results in the engagement of a wall 36 of aperture 35 with guide shaft 20 and the touching of conical surfaces 24 and 32. When such surfaces do engage, they provide support member 16 with additional support from base member 14 at the extreme angles where torque on the mount is greatest. It is to be understood, of course, that the 7° angle shown is for illustration only, and that the size and shape of members 14, 16 may be modified to change this angle as desired.

To lock support member 16 at a selected tilt, locking lever 18 is threadedly attached to a threaded portion 37 of guide shaft 20. Referring to FIG. 3, threaded portion 37 extends above a triangular-shaped recess 38 in support 16 but below its upper planar surface 30 so as to not interfere with the mounted refrigerator. Lever 18 is an elongated bar with an angled, threaded aperture within its head 39. Lever 18 attaches to guide shaft 20 and extends within recess 38 to beyond an outer edge 40 of support 16. As shown in FIG. 4, lever 18 is rotated clockwise within recess 38 from one inner edge 41 to a second opposing inner edge 42 and thereby inward along the threads of guide shaft 20 to urge support member 16 toward base member 14. The pressure applied by the lever against support member 16 creates sufficient frictional resistance between the two members to maintain the selected tilt. To change the angle of tilt, the lever is rotated counterclockwise to decrease the frictional resistance between the members 14, 16. The members 14, 16 can then again be moved relative to each other to a new tilt.

Lever 18, as shown in FIGS. 2 and 3, presses members 14, 16 sufficiently together in a single rotation to prevent their relative movement. Where the equipment supported by mount 10 is particularly heavy, however, a single rotation of a lever such as lever 18 may not provide sufficient pressure between the members. A second embodiment of the lever, shown in FIGS. 5 and 6 as lever 44, can be rotated repeatedly to press the members more firmly together. Lever 44 is removably mated to a nut assembly 46. Referring to FIG. 5, nut assembly 46 includes on one end a retaining ring 47 and on the opposite end a nut 50. In the midsection of assembly 46 is a shank 48. Assembly 46 extends through an octagonal aperture of lever 44 and is secured to the lever by a biasing means such as a spring 52 and retaining washer 53 that abut retaining ring 47. Spring 52 urges lever 44 into mating engagement with nut 50. To remove the lever 44 from the nut 50, torque is applied at the end of the lever (as shown by arrow 54 in FIG. 5) to pivot the lever at a leverage point 55 on the lever bottom side 56 intermediate its ends.

To tighten nut 50 on shaft 20, torque is applied to the end of lever 44 as just described and the lever is rotated counterclockwise to edge 41. The torque is then removed, and the spring 52 presses the lever 44 back into removable engagement with the nut 50. Lever 44 is then rotated clockwise to edge 42 to press nut 50 against the recessed surface 38 of the support 16. Once lever 44 reaches the edge 42, the torque is reapplied on spring 52 and the lever is swung counterclockwise to the edge 41. These repeated reciprocal rotations of lever 44 press support member 16 against base member 14 to create sufficient frictional resistance for maintaining a selected tilt.

To use the mount 10, locking lever 18 (or 44 in the second embodiment) is unlocked and support 16 is tilted relative to base 14 until refrigerator 12 is level. Support 16 can be rotated horizontally, of course, if so desired. The lever 18 is then rotated clockwise to press the two members firmly together to maintain the selected tilt.

Various changes and modifications of the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

We claim:

1. A tiltable mount for levelly maintaining equipment mounted thereon, comprising:
    a stationary base member having a planar bottom surface, concave spherical upper surface and a cylindrical, threaded guide shaft extending from within the concave surface normally along a vertical axis through the member;
    a movable support member having an upper planar surface with a recess therein, a convex spherical bottom surface for slidingly engaging the upper concave surface of the base member and a conical aperture having its base at the convex surface and its apex at the planar surface for pivotally receiving the guide shaft of the base member, the guide shaft extending into the recess but below the planar support surface along a vertical axis through the member, the support member capable of selectably tilting omnidirectionally relative to the base member without rotating relative to the vertical axis through the base and support members; and a locking lever means threadedly attached to the guide shaft to rotate within the recess perpendicular to the shaft to press the support member against the base member for locking the members against relative movement therebetween and thereby maintaining a selected tilt to the support member.

2. The tiltable mount of claim 1 in which the base member and support member have opposing conical surface beyond their mating spherical surfaces, the opposing surfaces engageable to limit the tilt of the support member and to provide the support member with additional support from the base member.

3. The tiltable mount of claim 1 in which the lever means includes a nut assembly having a nut for threadedly engaging the guide shaft to press the support member against the base member and a lever arm removably mated to the nut assembly for repeated movement of the nut.

4. The tiltable mount of claim 1 in which the locking lever means includes a nut assembly having a nut for threadedly engaging the guide shaft to press the support member against the base member and a lever arm removably mated to the nut assembly for repeated movement of the nut.

5. The tiltable mount of claim 4 in which the nut assembly includes in addition to the nut a retaining ring for retaining the assembly to the lever arm and a biasing means for urging the lever arm from the nut, the lever arm freely rotatable when urged from the nut and matingly engaged to the nut when urged thereon.

6. The tiltable mount of claim 1 in which the radius of the concave surface of the base member is about one-sixth of the width of the equipment mounted on the mount.

* * * * *